United States Patent
Sakuragi

(12) 
(10) Patent No.: US 7,023,482 B2
(45) Date of Patent: Apr. 4, 2006

(54) PROCESSING APPARATUS

(75) Inventor: Takamasa Sakuragi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 707 days.

(21) Appl. No.: 09/985,211

(22) Filed: Nov. 2, 2001

(65) Prior Publication Data

US 2002/0057355 A1    May 16, 2002

(30) Foreign Application Priority Data

Nov. 6, 2000    (JP)    ............................. 2000-337899

(51) Int. Cl.
*H04N 5/335*    (2006.01)
*H04N 5/217*    (2006.01)
*H01L 29/74*    (2006.01)

(52) U.S. Cl. ....................... 348/308; 348/241; 257/219

(58) Field of Classification Search ................ 348/308, 348/301, 294, 241, 207.99, 300, 302, 248; 250/208.1; 327/3; 330/308; 257/219

See application file for complete search history.

(56) References Cited

U.S. PATENT DOCUMENTS

| 5,811,808 | A | * | 9/1998 | Cannata et al. | ............. | 250/332 |
| 6,046,444 | A | * | 4/2000 | Afghahi | .................... | 250/208.1 |
| 6,762,398 | B1 | * | 7/2004 | Tanaka | .................... | 250/208.1 |
| 6,781,627 | B1 | * | 8/2004 | Takayanagi | ................. | 348/308 |

FOREIGN PATENT DOCUMENTS

JP    62-122488    6/1987

* cited by examiner

*Primary Examiner*—Lin Ye
(74) *Attorney, Agent, or Firm*—Fitzpatrick, Cella, Harper & Scinto

(57) ABSTRACT

In order to suppress variations in the set currents of a plurality of constant current circuits, there is provided a processing apparatus having a constant current supply unit including a plurality of constant current circuits, a plurality of sample/hold circuits for sampling/holding current values for maintaining currents supplied from the constant current circuits constant, and a constant current source for supplying a reference current for setting a current value to the plurality of sample/hold circuits.

6 Claims, 7 Drawing Sheets

PROCESSING APPARATUS

BACKGROUND OF THE INVENTION

1. Field of the Invention

The present invention relates to a processing apparatus having a constant current circuit.

2. Related Background Art

FIG. 5 is a circuit diagram of a conventional MOS solid-state image pickup element. FIG. 6 is a timing chart of this element.

Referring to FIG. 5, each photoelectric conversion cell S is comprised of a photodiode 1 (1-1-1, 1-1-2, 1-1-3, . . . ), transfer switch 2 (2-1-1, 2-1-2, 2-1-3, . . . ), reset switch 3 (3-1-1, 3-1-2, 3-1-3, . . . ), amplification transistor 4 (4-1-1, 4-1-2, 4-1-3, . . . ), and selection switch 5 (5-1-1, 5-1-2, 5-1-3, . . . ). As the transfer switch 2, reset switch 3, amplification transistor 4, and selection switch 5, MOS transistors can be used.

The signal stored in the photodiode 1 arranged in each photoelectric conversion cell S is read by the amplification transistor 4 as a voltage to a vertical output line 8 (8-1, 8-2, 8-3, . . . ) connected to the amplification transistor 4. At this time, since a source follower circuit is constituted by the amplification transistor 4 and a load transistor 9 (9-1, 9-2, . . . ) serving as a constant current circuit, a voltage signal corresponding to the signal in the photodiode 1 is read to the vertical output line 8. Voltages are applied to the gates of the load transistors 9-1, 9-2, 9-3, . . . by a constant current source 25 and transistors 26 whose drains are short-circuited to the gates, thereby forming current mirror circuits. The load transistor 9, constant current source 25, and transistor 26 constitute a constant current supply means.

This arrangement also includes a source follower circuit which receives a voltage from the vertical output line 8 to drive a clamp capacitor 13 (13-1, 13-2, 13-3, . . . ). This source follower circuit is comprised of a transistor 11 (11-1, 11-2, 11-3, . . . ) and a transistor 12 (12-1, 12-2, 12-3, . . . ) serving as a constant current circuit. Voltages are applied to the gates of the transistors 12-1, 12-2, 12-3, . . . by a constant current source 24 and transistors 23 whose drains are short-circuited to the gates, thereby forming current mirror circuits. A transistor 14 (14-1, 14-2, 14-3, . . . ) serves to set a predetermined potential at the output-side terminal of the clamp capacitor 13. A power supply terminal 22 is set at a predetermined potential.

A signal voltage appearing on the vertical output line 8 passes through the transistor 11 serving as a buffer amplifier, the clamp capacitor 13, a vertical signal line 16 (16-1, 16-2, 16-3, . . . ), a horizontal transfer switch 17 (17-1, 17-2, 17-3, . . . ), and a horizontal signal line 18. The voltage signal is then output from an output terminal 21 through an amplifier 20 and negative feedback capacitor 19. The transistor 12, a transistor 23, and the constant current source 24 constitute a constant current supply means.

The horizontal transfer switches 17 are sequentially selected by the horizontal shift register to sequentially output signals from the vertical signal line 16 to the horizontal signal line 18. The control terminals (corresponding to the gates of MOS transistors) of the transfer switches 2 (2-1-1, 2-1-2, . . . , 2-2-1, 2-2-2, . . . ) of the respective cells arranged in the row direction are connected to signal lines 7 (7-1, 7-2, . . . ). The control terminals of the reset switches 3 (3-1-1, 3-1-2, . . . , 3-2-1, 3-2-2, . . . ) of the respective cells arranged in the row direction are connected to signal lines 6 (6-1, 6-2, . . . ). The control terminals of the selection switches 5 (5-1-1, 5-1-2, . . . , 5-2-1, 5-2-2, . . . ) of the respective cells arranged in the row direction are connected to signal lines 10 (10-1, 10-2, . . . ).

The operation of the above MOS solid-state image pickup element will be described with reference to FIG. 6. FIG. 6 is a timing chart showing the operation of a clamp noise reduction circuit for reading a signal and reducing noise in the signal in the MOS solid-state image pickup element.

As shown in FIG. 6, an H-level signal pulse 101 is applied to the signal line 10-1 to activate the amplification transistors 4-1-1, 4-1-2, . . . on the first row. An H-level signal pulse 102 is applied to the signal line 6-1 to turn on the reset transistors 3-1-1, 3-1-2, . . . on the first row to make a reset potential for the sensor appear on the vertical output lines 8-1, 8-2, 8-3, . . . . At almost the same time, an H-level signal pulse 104 is applied to the gates of the clamp transistors 14-1, 14-2, 14-3, . . . to apply, across the two terminals of each of the clamp capacitors 13-1, 13-2, 13-3, . . . , output voltages from the source followers 11-1, 11-2, and 11-3 in accordance with the potential of the clamp reference voltage applied from the terminal 22 and the sensor reset potential. With this operation, noise signals are read from the respective cells arranged on the first row to the vertical output line 8, thereby clamping the noise signals in the clamp capacitors 13.

An H-level signal pulse 103 is then applied to the signal line 7-1 to turn on the transfer switches 2-1-1, 2-1-2, 2-1-3, . . . . As a consequence, signal outputs corresponding to the signal charges in the photodiodes 1-1-1, 1-1-2, 1-1-3, . . . are read to the vertical output lines 8-1, 8-2, 8-3, . . . . Along with this operation, a potential corresponding to the output of the source follower 11 appears at one terminal of the clamp capacitor 13.

Subsequently, H-level signal pulses 105, 106, and 107 are sequentially applied to the gates of the horizontal transfer switches 17-1, 17-2, 17-3, . . . to sequentially turn on the horizontal transfer switches 17-1, 17-2, 17-3, . . . . As a consequence, a signal from each cell on the first row is output to the horizontal signal line 18. The signal charge is then converted into a signal voltage by the amplifier 20 and negative feedback capacitor 19 and output from the output terminal 21.

The above-described operation is performed with respect to the respective cells arranged on the second row, third row, . . . to read signals from all the cells.

The constant current circuit for the source follower in the above-described arrangement is formed on the premise that the gate and source of the transistor of the constant current circuit are set at the same potential (GND potential in this case). In practice, aluminum interconnections formed on a semiconductor substrate have certain resistances, and hence a voltage drop occurs when a current flows through such an interconnection. As the chip size of a sensor IC having many pixels increases, the length of an aluminum interconnection forming a GND line increases. As a consequence, an increase in the above voltage drop cannot be neglected. The set current of the constant current circuit for the source follower connected to each vertical output line 8 in FIG. 5 varies, and the current values decreases with increase of the distance from the GND terminal of the IC, resulting in a certain gradient (shading) in the output voltage of each vertical signal line. In addition, when the sensor is to be driven at high speed, the output impedance of the source follower must be decreased. Hence, the set current of the constant current circuit connected to the above source follower must be increased. As a result, the voltage drop at the GND interconnection increases, and hence the current value of the constant current greatly varies.

FIGS. 7A and 7B are a circuit diagram and graph schematically showing the above problem. Referring to FIG. 7A, this arrangement includes a power supply terminal 41, a GND terminal 42, a reference constant current source 43, vertical output lines 44 (44-1, 44-2, . . . ) respectively corresponding to the vertical output lines 8-1, 8-2, . . . in FIG. 5, and output terminals 45 of source followers. Transistors 46 and 47 constitute a source follower circuit. The GND interconnections have parasitic resistors 48 (48-1, 48-2, . . . ).

As shown in the graph of FIG. 7B, the current of the constant current circuit for each source follower decreases with an increase in distance from the GND terminal 42 with respect to the current of the reference current source.

SUMMARY OF THE INVENTION

It is an object of the present invention to suppress variations in current flowing in each constant current circuit with respect to a reference current.

In order to achieve the above object, according to an aspect of the present invention, there is provided a solid state image pickup apparatus comprising a plurality of amplifying type photoelectric conversion elements each comprising photoelectric conversion means and amplifying means for converting a signal charge formed by the photoelectric conversion means into a signal voltage and amplifying the signal voltage. The photoelectric conversion elements are arranged two dimensionally, and are connected commonly by a plurality of signal output lines for outputting signals through the signal output lines. Each of the signal output lines has a constant current supply means for supplying a current. The current supply means includes; (1) a constant current circuit having a transistor: (2) a sample hold means having switching means and capacitor means wherein the switching means is disposed between one of main electrodes of the transistor and a control electrode of the transistor, the capacitor means is connected to the control electrode, thereby maintaining the current supplied from the constant current circuit; and (3) a reference current source for supplying the voltage corresnonding to the reference current to the capacitor of the sample hold means through the switching means.

The above and other objects, features, and advantages of the present invention will be apparent from the following detailed description in conjunction with the accompanying drawings and the appended claims.

DETAILED DESCRIPTION OF THE PREFERRED EMBODIMENTS

Embodiments of the present invention will be described in detail below with reference to the accompanying drawings.

Figure 1:
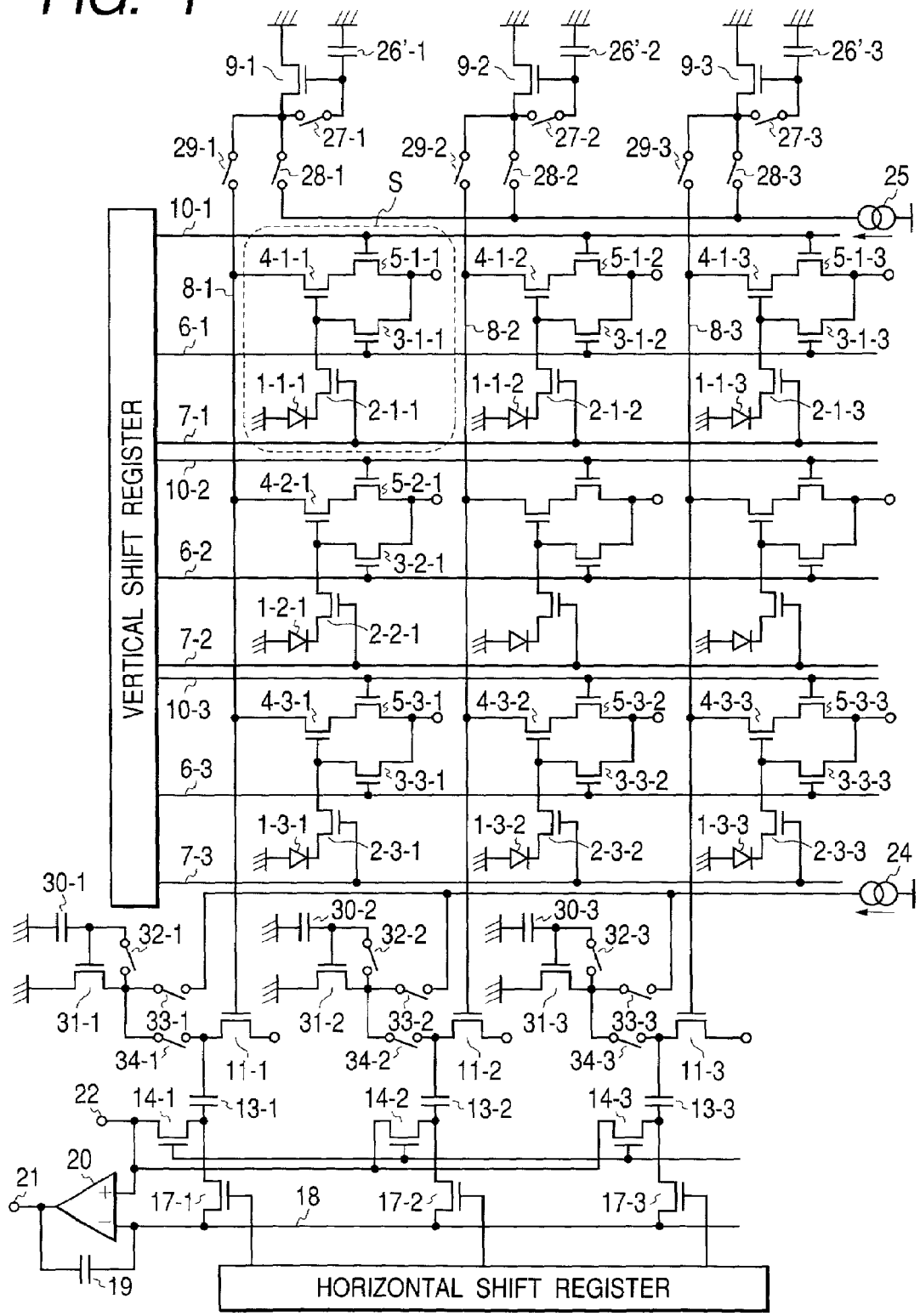
FIG. 1 is a circuit diagram showing a solid-state image pickup element according to the first embodiment of the present invention.
Figure 2:
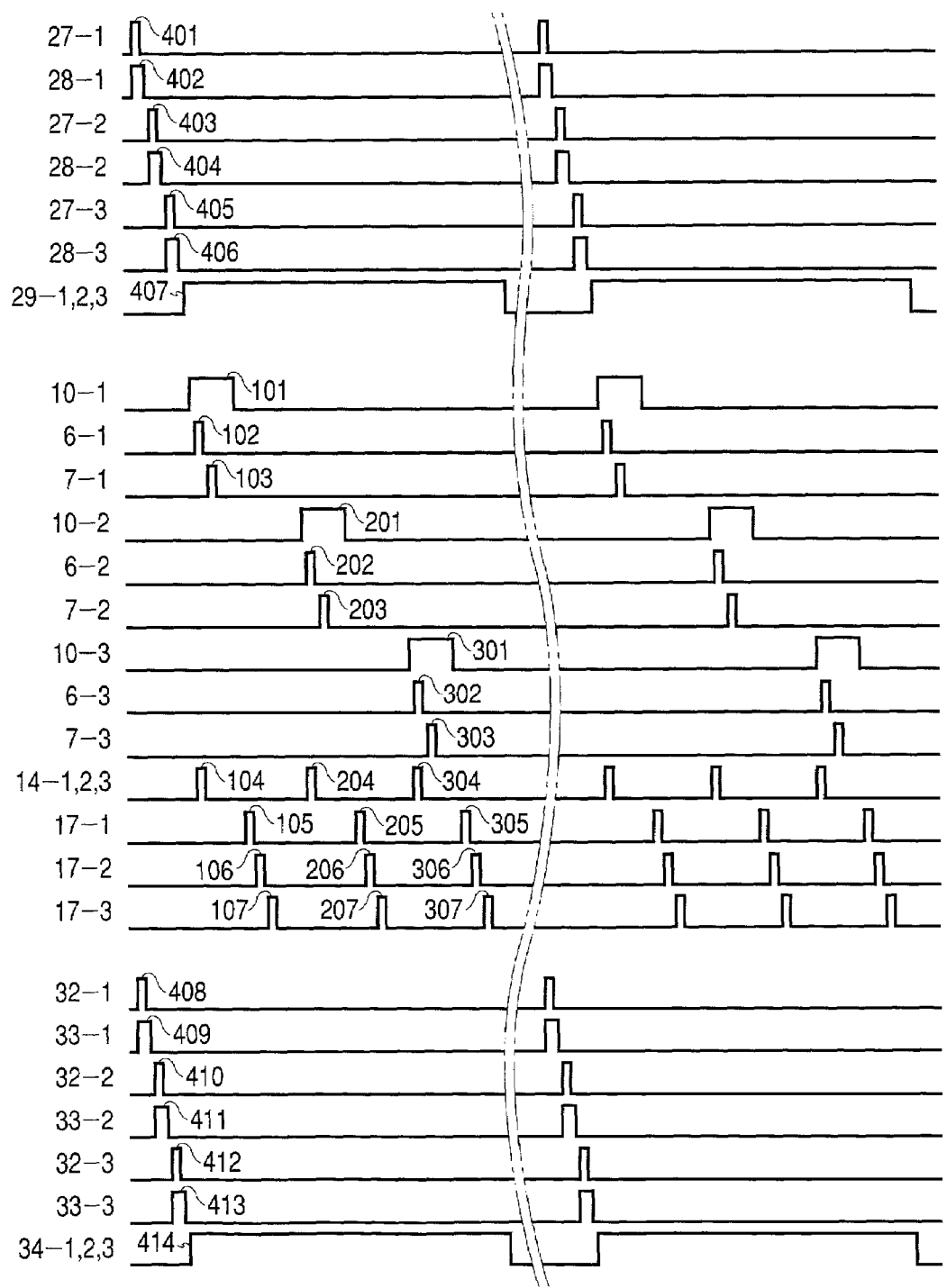
FIG. 2 is a timing chart showing bias current sampling/holding operation and the operation of a clamp noise reduction circuit for outputting a sensor signal and reducing noise contained in the signal.

FIG. 1 is a circuit diagram showing a solid-state image pickup element according to the first embodiment of the present invention. FIG. 2 is a timing chart of this element. Since the arrangement of each photoelectric conversion cell in FIG. 1 is identical to that in FIG. 5, the same reference numerals as in FIG. 5 denote the same parts in FIG. 1, and a description thereof will be omitted.

Figure 5:
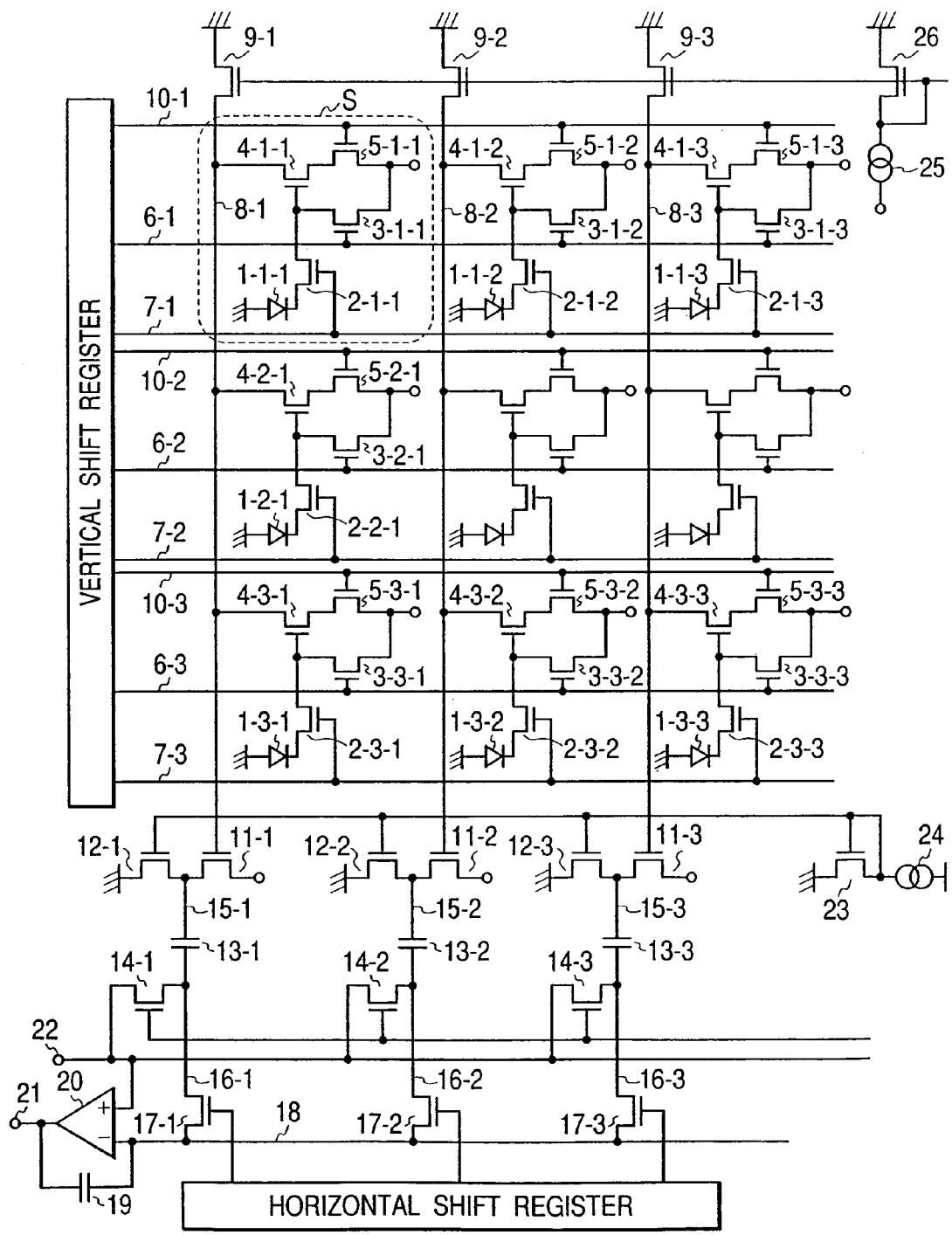
FIG. 5 is a circuit diagram showing a conventional MOS solid-state image pickup element.

In this embodiment, circuits for sampling/holding currents from constant current sources 24 and 25 are inserted in constant current circuits (9 and 12 in FIG. 5) for applying biases to the source followers in FIG. 5. Note that a load transistor 9, the constant current source 25, a hold capacitor 26', and a switch 27 constitute a constant current supply unit, and a transistor 31, a switch 32, the constant current source 24, and a hold capacitor 30 constitute a constant current supply unit.

Referring to FIG. 1, this arrangement includes the hold capacitors 26' (16'-1, 26'-2, . . . ), the switches 27 (27-1, 27-2, . . . ), switches 28 (28-1, 28-2, . . . ), switches 29 (29-1, 29-2, . . . ), hold capacitors 30 (30-1, 30-2, . . . ), the switches 32 (32-1, 32-2, . . . ), switches 33 (33-1, 33-2, . . . ), and switches 34 (34-1, 34-2, . . . ). As the switches 27, 28, 29, 32, 33, and 34, for example, MOS transistors can be used. The arrangement also includes the load transistors 31 (31-1, 31-2, . . . ).

The switches 27 and 28 are turned on in current sampling operation, and turned off in holding operation. The switch 29 operates in opposite phase. That is, the switch 29 is turned off in sampling operation, and turned on in holding operation. With this operation, an output current from the constant current source 25 is sampled/held. Likewise, the switches 32 and 33 are turned on in current sampling operation, and turned off in holding operation. The switch 34 operates in opposite phase. That is, the switch 34 is turned off in sampling operation, and turned on in holding operation. With this operation, an output current from the constant current source 24 is sampled/held.

FIG. 2 is a timing chart showing sampling/holding operation of the above-described bias currents and the operation of a clamp noise reduction circuit for outputting the sensor signal described with reference to FIG. 6 and reducing noise contained in the signals. Since the operation for a sensor signal and the timing chart are the same as those in FIG. 6, a description thereof will be omitted.

The above-described current sampling operation is performed during a vertical blanking period before the transfer of a signal.

While an L-level signal 407 is supplied to the switch 29-1, H-level signal pulses 401 and 402 are respectively supplied to the switches 27-1 and 28-1 to turn on the switches 27-1 and 28-1 and turn off the switch 29-1. As a consequence, a gate-source voltage corresponding to the current value of the constant current source 25 is generated in the transistor 9-1. This voltage is held in the hold capacitor 26'-1. In consideration of the problem associated with the parasitic charge in switches, the switch 27-1 is turned off earlier than the switch 28-1. With similar operation, signal pulses 403 and 404 are applied to the switches 27-2 and 28-2 to turn them on, and the gate-source voltage of the transistor 9-2 is held in the hold capacitor 26'-2. Finally current sampling operations are done in this manner, the signal pulse 407 is set at H level to turn on the switches 29-1, 29-2, and 29-3, and the bias constant currents generated in the transistors 9-1, 9-2, and 9-3 are supplied to vertical output lines 8-1, 8-2, and 8-3.

At the same timing as that of the current sampling operation described above, currents from the source follower bias current circuit are sampled.

While an L-level signal 414 is supplied to the switch 34-1, H-level signal pulses 408 and 409 are respectively supplied to the switches 32-1 and 33-1 to turn on the switches 32-1 and 33-1 and turn off the switch 34-1. As a consequence, a gate-source voltage corresponding to the current value of the constant current source 24 is generated in the transistor 31-1. This voltage is held in the hold capacitor 30-1. In consideration of the problem associated with the parasitic charge in switches, the switch 32-1 is turned off earlier than the switch 33-1. With similar operation, signal pulses 410 and 411 are applied to the switches 32-2 and 33-2 to turn them on, and the gate-source voltage of the transistor 31-2 is held in the hold capacitor 30-2. Finally current sampling operations are done in this manner, the signal pulse 414 is set at H level to turn on the switches 31-1, 31-2, and 31-3, and the bias constant currents generated in the transistors 31-1, 31-2, and 31-3 are supplied to source followers 11-1, 11-2, and 11-3.

Figure 6:
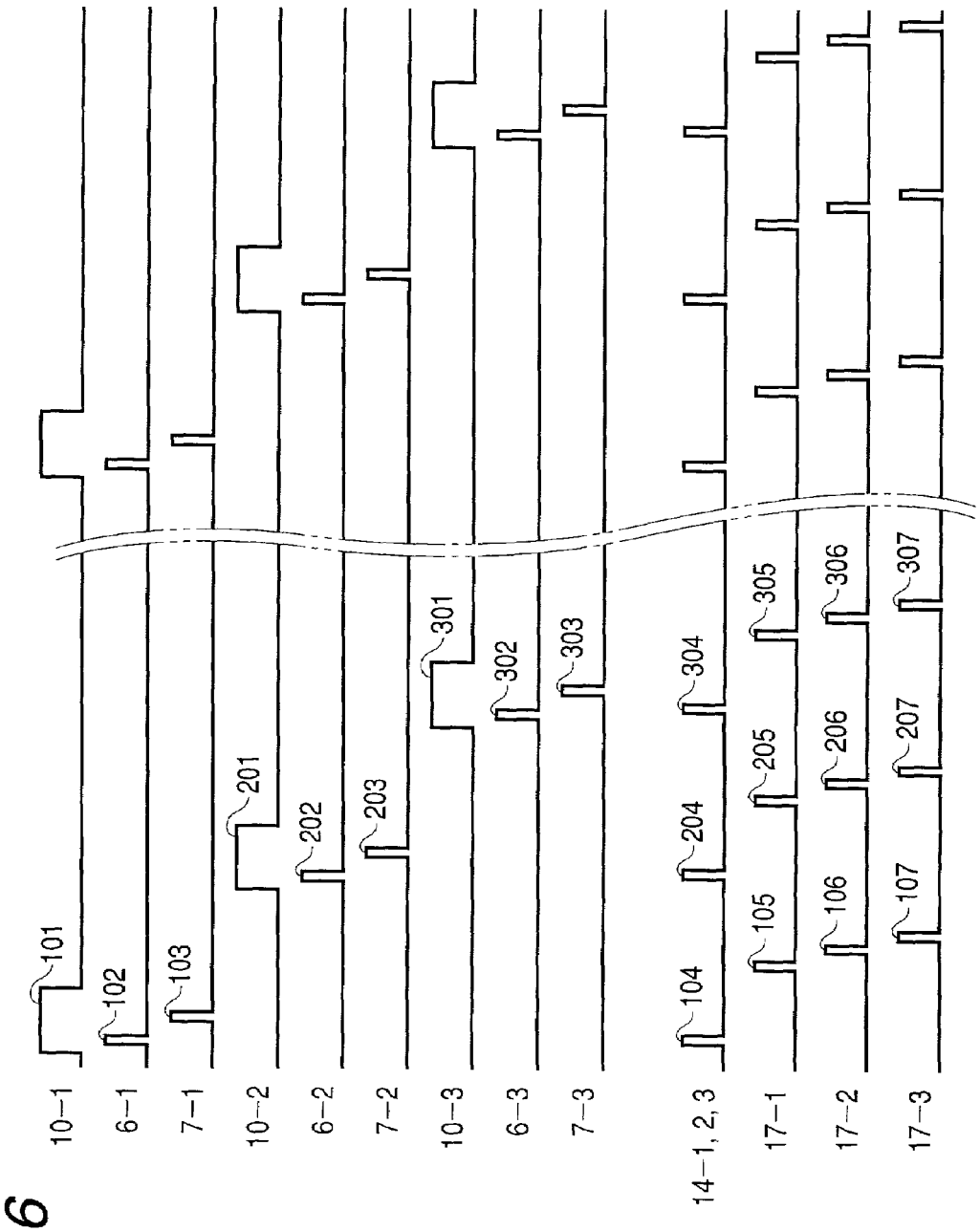
FIG. 6 is a timing chart showing the operation of the MOS solid-state image pickup element in FIG. 5.
Figure 7A:
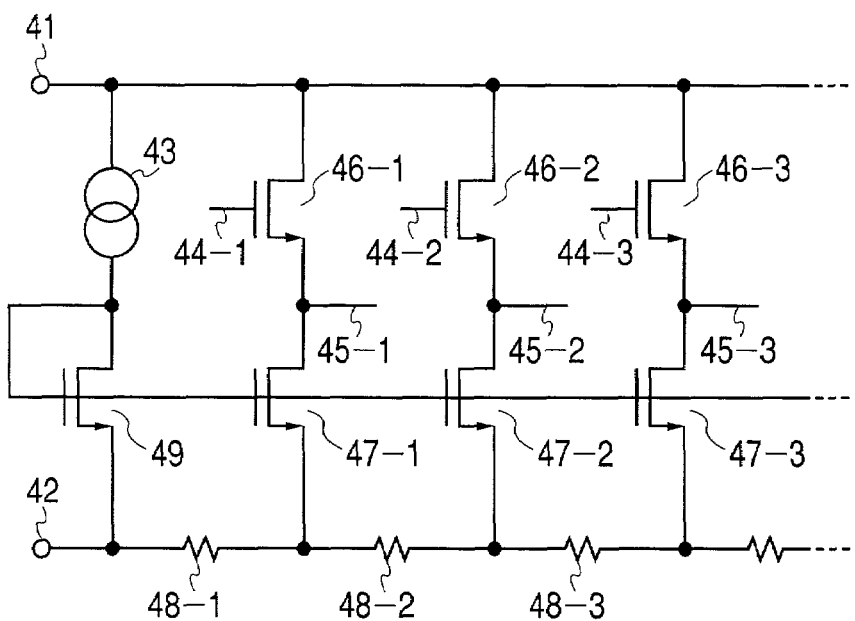
FIG. 7A is a circuit diagram schematically showing a problem in the prior art.
Figure 7B:
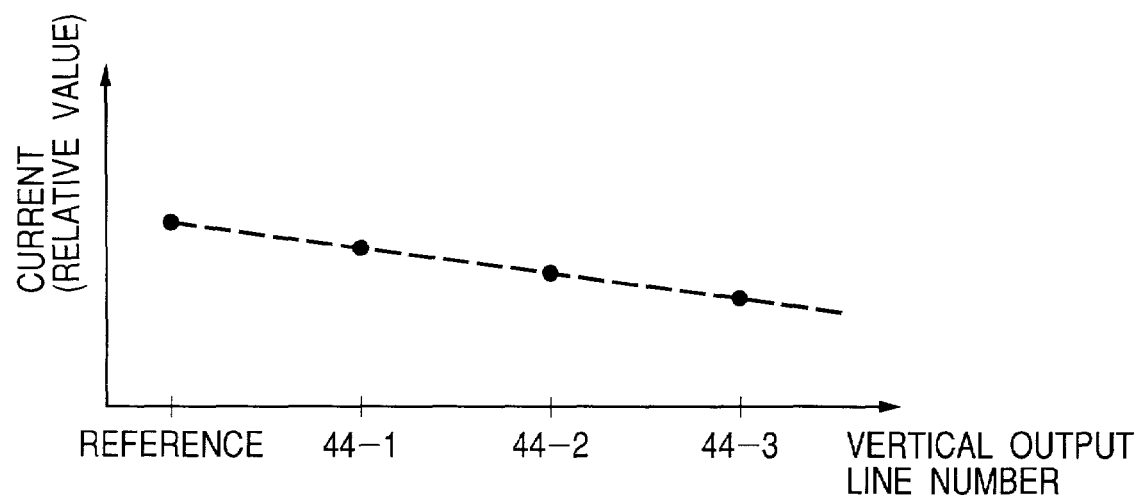
FIG. 7B is a graph showing the characteristics of the prior art.

After the settings required in the sensor are completed by sampling of bias currents, the signal read operation described with reference to FIG. 6 is performed.

By performing such bias current settings, both an increase in the driving speed of each sensor and an increase in resolution can be attained without variations in signal voltage, such as shading, in vertical signal lines even with an increase in the value of each bias current.

The above-described bias current setting method is not limited to source followers, and can be applied to various circuits whose outputs depend on variations in GND potential or power supply voltage, including, for example, bias current circuits such as operational amplifiers attached to the respective signal lines.

Figure 3:
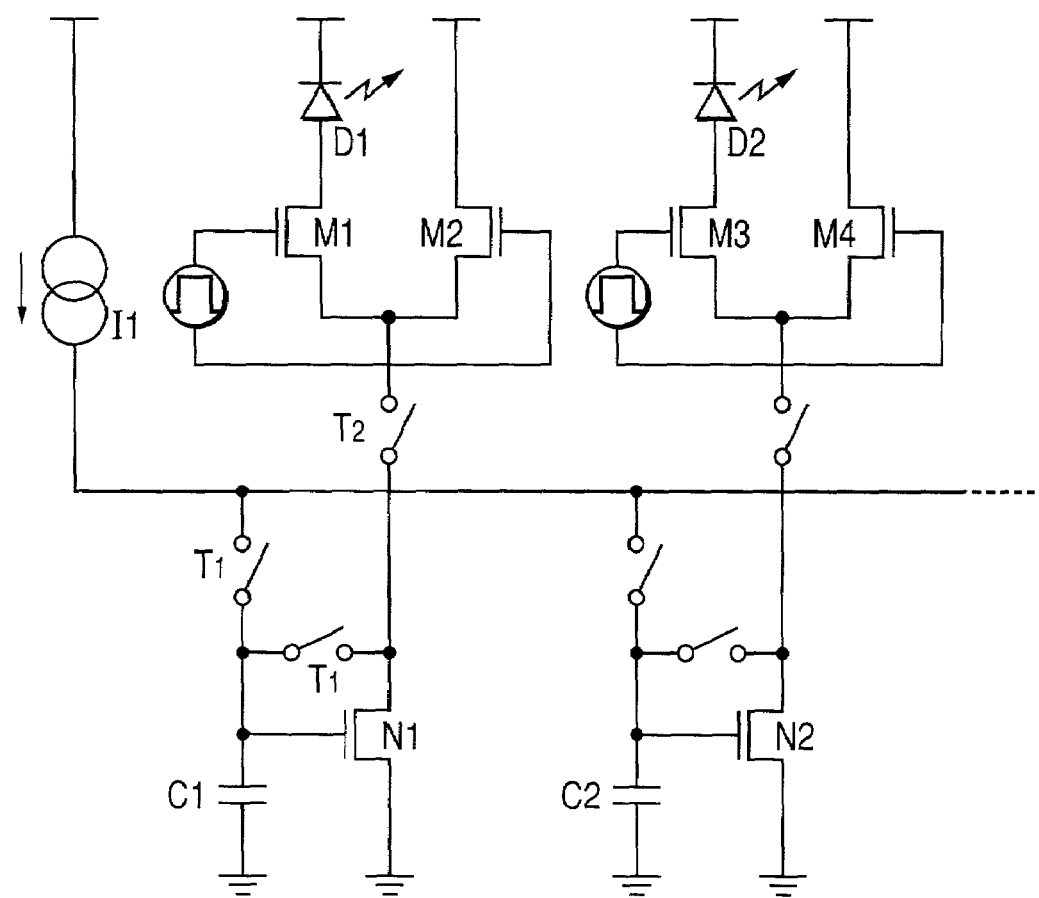
FIG. 3 is a circuit diagram showing a light-emitting apparatus according to the second embodiment of the present invention.

FIG. 3 is a circuit diagram showing a light-emitting apparatus according to the second embodiment of the present invention, and more specifically, a light-emitting element driving circuit in a device whose output characteristics are required to exhibit high relative precision, e.g., a laser beam printer, which is designed to drive a plurality of light-emitting elements such as laser diodes or light-emitting diodes suitable for constant current driving.

Referring to FIG. 3, this apparatus includes laser diodes or light-emitting diodes D1, D2, . . . (LEDs) (to be described as laser diodes hereinafter), MOS transistors M1 to M4, . . . constituting a differential circuit for switching the laser diodes D1, D2, . . . , switches T1 and T2 for sampling a current from a constant current source I1 as in the first embodiment, and transistors N1, N2, . . . , which store a gate-source voltage (gs) corresponding to the current value of the current source I1 in hold capacitors C1, C2, . . . . Since this current sampling operation is the same as in the first embodiment, a description thereof will be omitted.

Recently, the switching speed of each light-emitting element has become vary high in optical communication and the like, and hence the bias current of the above differential circuit has become a large value to allow this high-speed operation. A variation in GND potential as the source voltage of each of the transistors N1 to N2, . . . constituting the constant current circuit has become large due to the voltage drop caused by the parasitic resistor which each GND interconnection has. Obviously, therefore, as the source potential of the MOS transistor N1 varies, the above-described bias current also varies.

The current/emission intensity characteristics of a plurality of light-emitting elements and the relative precision of pulse widths in switching greatly depend on the relative precision of the above-described bias current. In an optical communication device or laser beam printer using the above-described light-emitting elements, therefore, it is important to improve the relative precision of the bias current. The relative precision of the bias current can be improved by using the light-emitting driving circuit shown in FIG. 3.

The third embodiment in which the solid-state image pickup element described in the embodiment is applied to a digital still camera (image pickup apparatus) will be described in detail with reference to FIG. 4.

Figure 4:
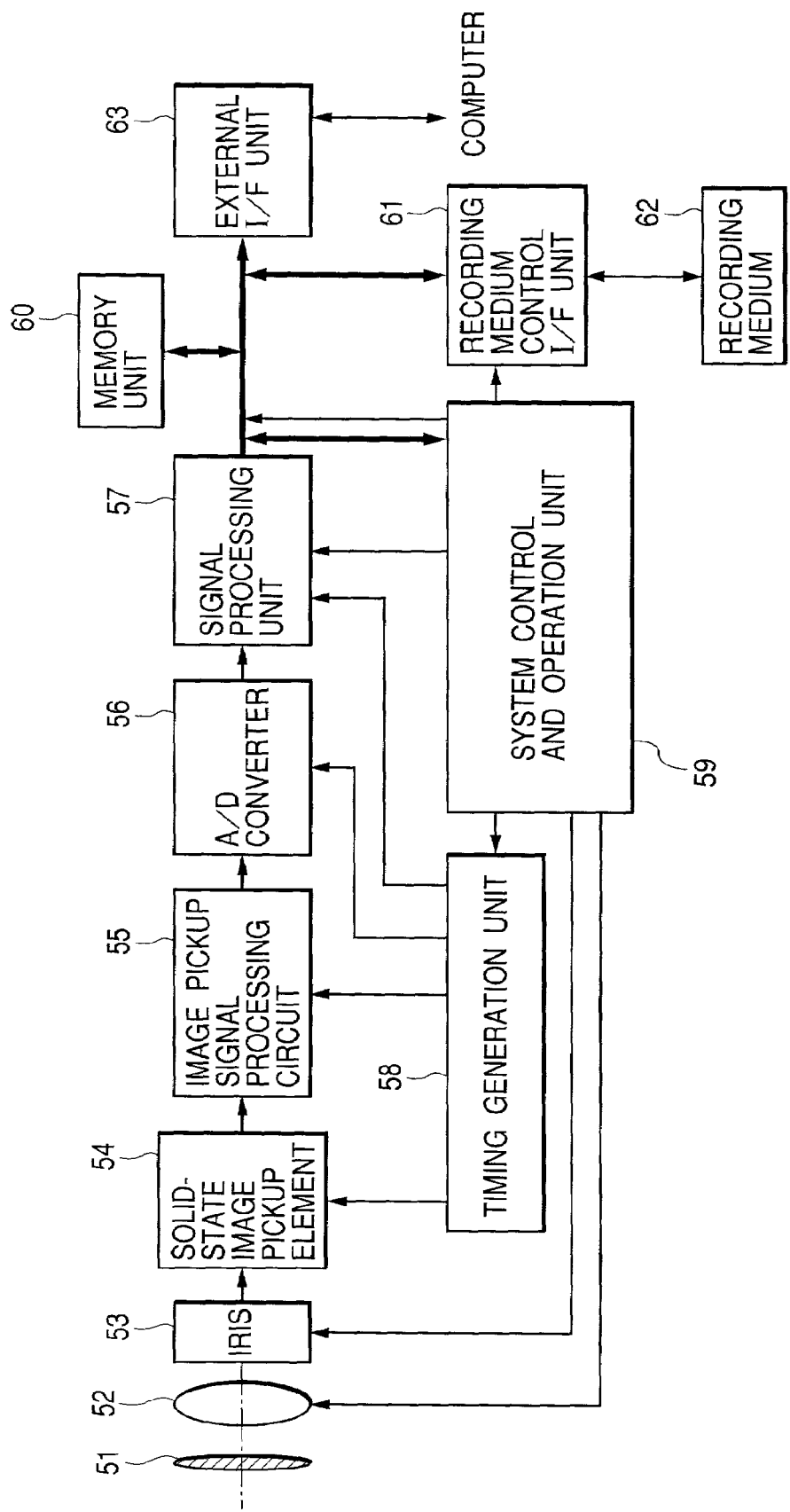
FIG. 4 is a block diagram showing a case wherein the solid-state image pickup element according to the first embodiment is applied to a digital still camera.

Referring to FIG. 4, this camera includes a barrier 51 which protects the lens and also serves as a main switch, a lens 52 for forming an optical image of an object on a solid-state image pickup element 54, an iris 53 for changing the amount of light passing through the lens 52, the solid-state image pickup element 54 for capturing the object image formed by the lens 52 as an image signal, an A/D converter 56 for performing analog/digital conversion of the image signal output from the solid-state image pickup element 54, a signal processing unit 57 for performing various corrections for the image data output from the A/D converter 56 and compressing the data, a timing generation unit 58 for outputting various timing signals to the solid-state image pickup element 54, image pickup signal processing circuit 55, A/D converter 56, and signal processing unit 57, a system control and operation unit 59 for controlling various computations and the overall still/video camera, a memory unit 60 for temporarily storing image data, a recording medium control I/F unit 61 for recording/reading data on/from a recording medium, a detachable recording medium 62 such as a semiconductor memory for recording/reading image data, and an external I/F unit 63 for communicating with an external computer or the like.

The operation of a still/video camera with the above-described arrangement in photographing operation will be described next.

When the barrier 51 is opened, the main power supply is turned on, and the power supply of the control system is then turned on. In addition, the power supply of the image pickup system circuit including the A/D converter 56 and the like is turned on. The system control and operation unit 59 opens the iris 53 to control the exposure amount. A signal output from the solid-state image pickup element 54 is converted by the A/D converter 56 and input to the signal processing unit 57.

The system control and operation unit 59 computes an exposure amount on the basis of this data. The system control and operation unit 59 determines brightness on the basis of this photometry result, and controls the iris in accordance with the determination result.

The system control and operation unit 59 computes the distance to the object by extracting a high-frequency component from the signal output from the solid-state image pickup element 54. The system control and operation unit 59 then drives the lens and determines whether an in-focus state is obtained. If the system control and operation unit 59 determines that correct focus is not obtained, the unit drives the lens again and performs distance measurement. After the in-focus state is determined, main exposure is started.

Upon completion of the exposure, the image signal output from the solid-state image pickup element 54 is A/D-converted by the A/D converter 56. The resultant signal is then written in the memory unit 60 by the system control and operation unit 59 through the signal processing unit 57.

The data stored in the memory unit 60 is recorded on the detachable recording medium 62 such as a semiconductor memory through the recording medium control I/F unit 61 under the control of the system control and operation unit 59.

Alternatively, the image signal may be directly input to a computer or the like through the external I/F unit 63 to be processed.

As has been described above, the influence of a voltage drop due to the parasitic resistance which each of GND and power supply interconnections has is avoided to suppress variations in the set currents of a plurality of constant current circuits.

In particular, in many circuits whose output currents are affected by variations in GND potential and power supply potential, including, for example, the constant current circuits connected to vertical signal lines, in the image pickup apparatus, an output current as a reference from the constant current source is sampled/held, and a current is set by referring to a given reference voltage. This makes it possible to avoid the influence of a voltage drop due to a current consumed by the apparatus itself and the like and the parasitic resistance which each of the GND and power supply interconnections has, and improve the precision of an output from the solid-state image pickup element.

According to the above description, the constant current supply unit is applied to the solid-state image pickup element (or digital still camera) and the processing apparatus such as a light-emitting apparatus. However, this apparatus may be applied to an apparatus which is required to suppress variations in current flowing in each constant current circuit with respect to a reference current.

Note that the present invention can be applied to both a discharge type constant current circuit for supplying a current by supplying the current into a load and a sink type constant current circuit for supplying a current in the manner in which the current is supplied from a load.

Many widely different embodiments of the present invention may be constructed without departing from the spirit and scope of the present invention. It should be understood that the present invention is not limited to the specific embodiments described in the specification, except as defined in the appended claims.

What is claimed is:

1. A solid state image pickup apparatus comprising a plurality of amplifying type photoelectric conversion elements each comprising photoelectric conversion means and amplifying means for converting a signal charge formed by the photoelectric conversion means into a signal voltage and amplifying the signal voltage, the photoelectric conversion elements being arranged two dimensionally, and being connected commonly by a plurality of signal output lines for outputting signals through the signal output lines, wherein
   each of the signal output lines has a constant current supply means for supplying a current, and
   the current supply means comprises
   a constant current circuit having a transistor;
   a sample hold means having switching means and capacitor means, wherein the switching means is disposed between one of main electrodes of the transistor and a control electrode of the transistor, the capacitor means is connected to the control electrode, thereby maintaining the current supplied from the constant current circuit; and
   a reference current source for supplying the voltage corresponding to the reference current to the capacitor of the sample hold means through the switching means.

2. An apparatus according to claim 1,
   further comprising a plurality of pixels each having a photoelectric conversion unit and an amplification transistor adapted to convert a signal charge formed by the photoelectric conversion unit into a signal voltage and amplify the voltage, and a plurality of signal output lines to which signals from said plurality of pixels are output,
   wherein said constant current supply means supplies a bias current to said plurality of signal output lines.

3. An apparatus according to claim 1,
   further comprising a plurality of pixels each having a photoelectric conversion unit, a plurality of signal output lines to which signals from said plurality of pixels are output, and buffer amplifiers respectively connected to said plurality of signal output lines,
   wherein said constant current supply means supplies a bias current to said buffer amplifier.

4. An apparatus according to claim 3, wherein
   said pixel comprises an amplification transistor adapted to convert a signal charge formed by the photoelectric conversion unit into a signal voltage and amplify the voltage, and
   said constant current supply means supplies bias currents to the plurality of signal output lines.

5. An apparatus according to claim 3, wherein the buffer amplifier is a field-effect transistor, and forms a source follow circuit together with said constant current circuit.

6. An apparatus according to claim 2, further comprising an optical system for forming light into images on said plurality of pixels, an A/D conversion circuit adapted to convert output signals from a plurality of signal output lines into digital signals, and a signal processing circuit adapted to process signals from said A/D conversion circuit.

* * * * *

UNITED STATES PATENT AND TRADEMARK OFFICE
CERTIFICATE OF CORRECTION

PATENT NO. : 7,023,482 B2  
APPLICATION NO. : 09/985211  
DATED : April 4, 2006  
INVENTOR(S) : Takamasa Sakuragi It is certified that error appears in the above-identified patent and that said Letters Patent is hereby corrected as shown below:

COLUMN 3

Line 40, "corresnonding" should read --corresponding--.

Signed and Sealed this

Twelfth Day of June, 2007

JON W. DUDAS  
*Director of the United States Patent and Trademark Office*